US012782801B2

(12) United States Patent
Bauer

(10) Patent No.: US 12,782,801 B2
(45) Date of Patent: Nov. 3, 2026

(54) CAMERA FOR A MOTOR VEHICLE AND METHOD FOR ASSEMBLING A CAMERA

(71) Applicant: Robert Bosch GmbH, Stuttgart (DE)

(72) Inventor: Nikolai Bauer, Moeglingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 149 days.

(21) Appl. No.: 18/951,186

(22) Filed: Nov. 18, 2024

(65) Prior Publication Data

US 2025/0189880 A1 Jun. 12, 2025

(30) Foreign Application Priority Data

Dec. 12, 2023 (DE) ..................... 10 2023 212 546.3

(51) Int. Cl.
*G03B 30/00* (2021.01)
*G03B 17/12* (2021.01)

(52) U.S. Cl.
CPC ............. *G03B 30/00* (2021.01); *G03B 17/12* (2013.01); *G03B 2217/002* (2013.01)

(58) Field of Classification Search
CPC .. G03B 30/00; G03B 17/12; G03B 2217/002; H04N 23/55; H04N 23/54
See application file for complete search history.

(56) References Cited

U.S. PATENT DOCUMENTS

| | | | | |
|---|---|---|---|---|
| 8,436,931 | B2 * | 5/2013 | Lee | H04N 23/20 348/340 |
| 2018/0098033 | A1 * | 4/2018 | Mleczko | B60Q 1/1423 |
| 2020/0314311 | A1 * | 10/2020 | Liu | B60R 11/04 |
| 2022/0089102 | A1 * | 3/2022 | Sauer | H04N 23/52 |
| 2023/0009451 | A1 * | 1/2023 | Connolly | H04N 23/57 |
| 2024/0422411 | A1 * | 12/2024 | Brinks | H04N 23/55 |
| 2025/0039526 | A1 * | 1/2025 | Nakamura | H04N 23/51 |
| 2026/0036807 | A1 * | 2/2026 | Kurogi | G02B 27/0006 |

FOREIGN PATENT DOCUMENTS

| | | | |
|---|---|---|---|
| DE | 102021210306 | A1 | 3/2023 |
| DE | 102022211411 | A1 | 5/2024 |

* cited by examiner

*Primary Examiner* — Shahbaz Nazrul
(74) *Attorney, Agent, or Firm* — NORTON ROSE FULBRIGHT US LLP

(57) ABSTRACT

A camera for a motor vehicle. The camera includes a lens assembly having a lens assembly housing and at least one optical lens; a printed circuit board having an image sensor arranged on the printed circuit board, wherein the image sensor faces the lens assembly and is optically aligned with the latter; and a carrier element that is fastened to the printed circuit board. The carrier element is fastened to the printed circuit board on a side of the printed circuit board carrying the image sensor; wherein the carrier element has at least three spring-loaded tabs pointing in the axial direction towards the lens assembly; wherein the lens assembly housing has a crowned contour against which the spring-loaded tabs are configured to rest; and wherein the spring-loaded tabs are fastened to the crowned contour of the lens assembly housing in each case by means of a laser-welded joint.

9 Claims, 8 Drawing Sheets

CAMERA FOR A MOTOR VEHICLE AND METHOD FOR ASSEMBLING A CAMERA

CROSS REFERENCE

The present application claims the benefit under 35 U.S.C. § 119 of German Patent Application No. DE 10 2023 212 546.3 filed on Dec. 12, 2023, which is expressly incorporated herein by reference in its entirety.

FIELD

The present invention relates to a camera for a motor vehicle and a method for assembling a camera.

BACKGROUND INFORMATION

When fitting certain conventional, the procedure is often as follows: first, an image sensor is fixed to a printed circuit board and a lens holder is glued to the printed circuit board. Subsequently, the lens assembly is usually positioned and fixed in the lens holder. Here, the lens assembly is actively aligned with the image sensor and permanently fixed in the focused position via an adhesive bond.

An alternative to this, without adhesive bonds, described in German Patent Application No. DE 10 2022 211 411. In German Patent Application No. DE 10 2022 211 411, a camera for a motor vehicle is described comprising a lens assembly having at least one optical lens; a camera housing, wherein the lens assembly is fixed to the camera housing; a printed circuit board having an image sensor arranged on the printed circuit board, wherein the image sensor faces the lens assembly and is optically aligned with the latter. Here, the camera further comprises a carrier element, which is fastened to the printed circuit board on a side of the printed circuit board facing away from the image sensor by means of at least one soldered joint, and wherein the carrier element is designed in such a way that a gap is formed between the camera housing and the carrier element; and at least one gap-bridging element, which is fastened in contact points to the carrier element and in contact points to the camera housing by means of laser-welded joints.

The present invention provides a further alternative for a camera without adhesive bonds.

SUMMARY

The present invention is based on a camera for a motor vehicle comprising a lens assembly with a lens assembly housing and at least one optical lens; a printed circuit board having an image sensor arranged on the printed circuit board, wherein the image sensor faces the lens assembly and is optically aligned with the latter; and a carrier element that is fastened to the printed circuit board.

According to an example embodiment of the present invention, the carrier element is fastened to the printed circuit board on a side of the printed circuit board carrying the image sensor. Here, the carrier element has at least three spring-loaded tabs pointing in an axial direction towards the lens assembly. The lens assembly housing also has a crowned contour against which the spring-loaded tabs are designed to rest. Here, the spring-loaded tabs are in each case fastened to the crowned contour of the lens assembly housing by a laser-welded joint.

According to an example embodiment of the present invention, the carrier element is configured in particular as a stamped-bent part. The spring-loaded tabs can be designed in such a way that they partially rest against the crowned contour of the lens assembly housing. The spring-loaded tabs of the carrier element are designed in particular in such a way that they rest against the crowned contour of the lens assembly housing with one end pointing towards the lens assembly. Each of the at least three spring-loaded tabs rest in particular in each case against a contact point on the crowned contour of the lens assembly housing. In other words, in each case a laser-welded joint is formed at each of the at least three contact points.

The crowned contour of the lens assembly housing can be understood as a rounded or spherical contour.

The lens assembly housing can have different shapes. For example, the lens assembly housing can be designed to be round. For example, the lens assembly housing can be designed to be angular. The printed circuit board is configured in particular to receive the image sensor. The printed circuit board can receive other components, such as a camera connector, along with other electronic components. In particular, the camera described here can also have an electrical connector that is designed to electrically connect the printed circuit board.

The fact that the image sensor is aligned with the lens assembly means in particular that the image sensor is positioned during a method for assembling the camera in such a way that images projected through the lens assembly onto the image sensor are of the best possible quality.

According to an example embodiment of the present invention, when assembling the camera, the carrier element can be displaced along a first axis (image vertical, x-axis) and along a second axis (image horizontal, y-axis) on the printed circuit board. This can be carried out, for example, in the step of optically aligning the image sensor to the lens assembly. After optical alignment, the carrier element can then be fastened to the printed circuit board, for example. When assembling the camera, the lens assembly housing, against whose crowned contour the spring-loaded tabs of the carrier element rest, can also be displaced along a third axis (focusing, z-axis) and along a first axis of rotation (rotation of the image sensor about the image vertical, X_rot) and a second axis of rotation (rotation of the image sensor about the image horizontal, Y_rot). When aligned in this way, the spring-loaded tabs can exert force on the lens assembly housing and thus ensure contact with the contour of the lens assembly housing.

An advantage of the present invention is that the spring-loaded tabs of the carrier element allow the image sensor to be easily aligned with the lens assembly during assembly of the camera.

The spring-loaded tabs allow the carrier element to make contact with the lens assembly housing. Due to the flexibility of the spring-loaded tabs, the lens assembly housing and therefore also the lens assembly with the image sensor can be easily and precisely aligned during fitting. The spring-loaded tabs allow for compensation for tolerances. The laser-welded joints also make a good and durable fixation possible. Adhesive bonds in the camera can be avoided. Adhesive bonds have the disadvantage of unfavorable behavior due to expansion in the event of temperature fluctuations, swelling due to moisture and/or the aging of their properties over time. By avoiding such adhesive bonds in the camera presented here, it can be achieved that the optical alignment of the image sensor to the lens assembly can be kept constant. For example, a change in the distance between the image sensor and the lens assembly and the associated defocusing can be avoided even with temperature fluctuations, humidity or over time. The connections between the spring-loaded tabs and the lens assembly housing are highly robust.

In an advantageous configuration of the present invention, it is provided that the carrier element is designed in one or more pieces. Here, a one-piece carrier element can be easily and precisely aligned on the printed circuit board. The advantage of a multi-piece carrier element is that more free space is available on the printed circuit board for additional components.

In a further advantageous configuration of the present invention, it is provided that the lens assembly housing has a collar protruding radially outwards and has the crowned contour at one end of the collar. Here, the spring-loaded tabs are designed in a manner extending from a flat plate of the carrier element, which is fastened to the printed circuit board, in an axial direction towards the collar.

Here, the flat plate of the carrier element in particular has a recess, in which the image sensor is arranged.

The flat plate of the carrier element can be designed to be quadrangular or polygonal, in particular with rounded corners. This is particularly the case if the camera housing and/or the printed circuit board is/are also designed to be quadrangular or polygonal. If the flat plate is designed to be square, for example, the carrier element has four spring-loaded tabs in particular. If the printed circuit board is designed to be square, for example, and the carrier element is designed in multiple pieces, for example, a part of the carrier element can be arranged in each of the four corners of the printed circuit board. In this example, each part of the carrier element has at least one spring-loaded tab pointing in the axial direction towards the lens assembly. Alternatively, the flat plate can also be designed to be round. This is particularly the case if the camera housing is also designed to be round. In this case, the spring-loaded tabs can be distributed about the carrier element.

The advantage of this configuration is that the lens assembly can be aligned very easily in all spatial directions. The tabs fastened to the crowned contour by means of laser welding can be stiffened and no longer spring back. As a result, with the method for assembling the corresponding camera, an alignment in the x and y-directions may not be necessary. Thus, the production process can be made more cost-effective, in particular in the case of a quadrangular or polygonal camera housing. In particular, the multi-piece design of the carrier element in combination with a lens assembly housing with a collar protruding radially outwards allows more cost-effective processing.

In a further advantageous configuration of the present invention, it is provided that the lens assembly housing has the crowned contour at an end facing the image sensor. And wherein the carrier element comprises a flat plate fastened to the printed circuit board, and wherein the spring-loaded tabs and the plate are connected to one another by means of an L-shaped portion.

Here, the flat plate of the carrier element in particular has a recess, in which the image sensor is arranged.

The flat plate of the carrier element can be designed to be quadrangular or polygonal, in particular with rounded corners. This is particularly the case if the camera housing and/or the printed circuit board is/are also designed to be quadrangular or polygonal. If the flat plate is designed to be square, for example, the carrier element has four spring-loaded tabs in particular. Alternatively, the flat plate can also be designed to be round. This is particularly the case if the camera housing is also designed to be round. In this case, the spring-loaded tabs can be distributed about the carrier element.

Alternatively, the flat plate of the carrier element can be designed to be quadrangular or polygonal, wherein the L-shaped portion forms a round recess on which the spring-loaded tabs are arranged in a distributed manner.

An advantage of this configuration of the present invention is that the lens assembly housing can be designed in particular as a rotationally symmetrical component (e.g., a rotating part). This is in particular the case if the lens assembly housing and in particular the camera housing as well are designed to be round. Such a lens assembly housing can be provided at low cost. With the method for producing the camera, the lens assembly housing can be aligned to the carrier element in a self-centering and tolerance-bridging manner.

In a further advantageous configuration of the present invention, it is provided that the carrier element is fastened to the printed circuit board in a material-locking or form-fitting manner. A material-locking bond can be a soldered joint, for example. A material-locking bond can be a laser-welded joint, for example. The advantage of this configuration is that a simple, cost-effective and robust connection can be formed between the printed circuit board and the carrier element.

In a further advantageous configuration of the present invention, it is provided that the printed circuit board has at least one aperture. Here, the carrier element has at least one rivet, by means of which it is fastened to the printed circuit board. Alternatively, the carrier element has at least one projection protruding into the at least one aperture, which is fastened in a material-locking manner to a fixing plate arranged on a side of the printed circuit board opposite the image sensor. Alternatively, a press-fit bushing is inserted into the aperture, to which the carrier element is fastened in a material-locking manner.

An advantage of this configuration is that adhesive bonds can be avoided.

In a further advantageous configuration of the present invention, it is provided that the camera also has a rear housing and a front housing. In other words, the camera has a housing comprising a rear housing and a front housing. Here, the rear housing and the front housing are connected to one another, in particular in a material-locking or form-fitting manner. Here, the front housing receives the lens assembly of the camera in particular. The lens assembly can be designed to be fixed to the front housing. The lens assembly and the front housing can be fastened to one another by means of a welded or soldered joint, for example. Here, in particular, the rear housing receives the printed circuit board and the carrier element.

The rear housing can also be regarded as a housing cover. Alternatively, the camera has a separate housing cover, which is connected to the rear housing on a side of the rear housing facing away from the lens assembly.

An advantage of this configuration is that the housing protects the camera from the ingress of media from the camera's surroundings.

In a further advantageous configuration of the present invention, it is provided that the front housing and the lens assembly housing are designed in one piece. In this case, the at least one lens of the lens assembly is arranged in a region of the front housing provided for this purpose. This simplifies the assembly of the camera. A separate fastening of the front housing to the lens assembly housing is not necessary.

The present invention also provides a method for assembling a camera. According to an example embodiment of the present invention, the method includes the following steps: providing a printed circuit board having an image sensor arranged thereon; arranging a carrier element on a side carrying the image sensor on the printed circuit board, wherein the carrier element has at least three spring-loaded tabs that, in the arrangement, are aligned pointing away from the image sensor; providing a lens assembly with a lens assembly housing and at least one optical lens, with the lens assembly housing having a crowned contour; inserting the lens assembly into the carrier element in such a way that the spring-loaded tabs rest against the crowned contour; optically aligning the image sensor with the lens assembly; fastening the carrier element to the printed circuit board; and fastening the spring-loaded tabs to the crowned contour of the lens assembly housing in each case by means of a laser-welded joint.

When optically aligning the image sensor to the lens assembly, the carrier element can be displaced along a first axis (image vertical, x-axis) and along a second axis (image horizontal, y-axis) on the printed circuit board. After optical alignment, the carrier element can then be fastened to the printed circuit board, for example. When optically aligning the image sensor to the lens assembly, the lens assembly housing, against whose crowned contour the spring-loaded tabs of the carrier element rest, can also be displaced along a third axis (focusing, z-axis) and along a first axis of rotation (rotation of the image sensor about the image vertical, X_rot) and a second axis of rotation (rotation of the image sensor about the image horizontal, Y_rot). Here, the spring-loaded tabs can exert force on the lens assembly housing and thus ensure contact with the contour of the lens assembly housing.

It is self-evident that the features mentioned above and those still to be explained below can be used not only in the combination specified in each case, but also in other combinations or alone, without departing from the scope of the present invention.

BRIEF DESCRIPTION OF THE DRAWINGS

Exemplary embodiments of the present invention are explained in more detail below with reference to the attached drawings. Identical reference signs in the figures refer to identical or similarly acting elements. The figures show.

DETAILED DESCRIPTION OF EXAMPLE EMBODIMENTS

Figure 1:
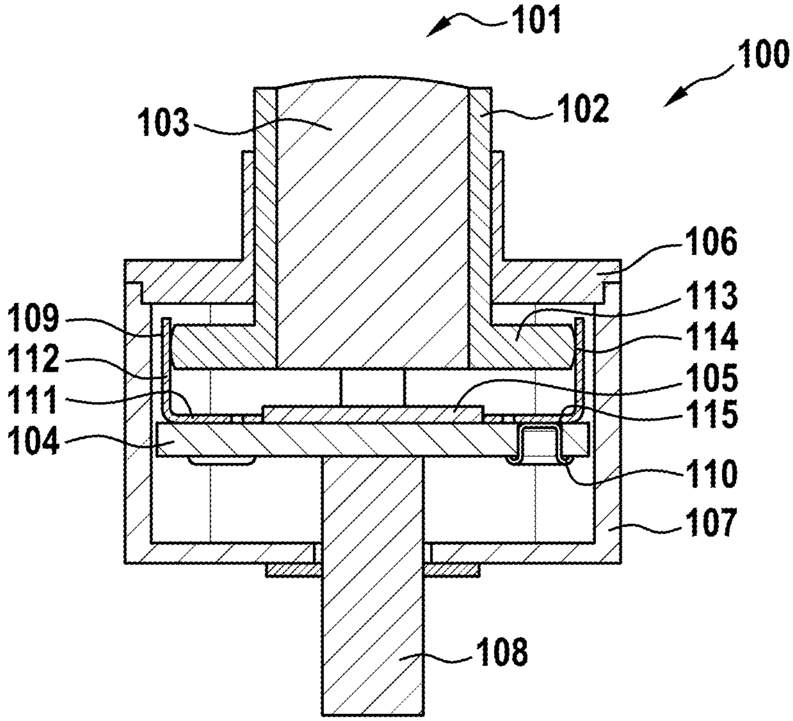
FIG. 1 shows a first exemplary embodiment of a camera in a sectional view, according to the present invention.

FIG. 1 shows a first exemplary embodiment of a camera 100 in a sectional view. The camera 100 comprises the lens assembly 101 having the lens assembly housing 102 and the optical lens 103. Here, the optical lens 103 can be a single optical lens or can comprise a plurality of optical lenses. The optical lens 103 can be a lens stack, for example. The camera 100 also comprises the printed circuit board 104 having the image sensor 105 arranged thereon. The image sensor 105 faces the lens assembly 101 and is optically aligned with it. Furthermore, the camera 100 comprises the carrier element 109, which is fastened to the printed circuit board 104. Here, it is fastened to the printed circuit board 104 on a side of the printed circuit board 104 carrying the image sensor 105. The carrier element 109 has at least three spring-loaded tabs 112 pointing in an axial direction towards the lens assembly 101. Due to the sectional view of the camera 100, only two spring-loaded tabs 112 can be seen in FIG. 1. The lens assembly housing 102 has a crowned contour 114, against which the spring-loaded tabs 112 are designed to rest. Here, the spring-loaded tabs 112 are fastened to the crowned contour 114 of the lens assembly housing 102 in each case by means of a laser-welded joint.

With the exemplary embodiment shown in FIG. 1, the lens assembly housing 102 is designed so that it has a collar 113 protruding radially outwards. The lens assembly housing 102 has the crowned contour 114 at one end of the collar 113. The spring-loaded tabs 112 of the carrier element 109 are designed in a manner extending from the flat plate 111 of the carrier element 109, which is fastened to the printed circuit board 104, in an axial direction towards the collar 113.

Furthermore, it can be seen that the printed circuit board 104 has an aperture 115. A press-fit bushing 110 is inserted in the aperture 115. The carrier element 109 is fastened to the press-fit bushing 110 in a material-locking manner. As a result, the carrier element 109 is fastened to the printed circuit board 104. In other words, the carrier element 109 is fastened to the printed circuit board 104 by means of a material-locking bond. It can also be seen in FIG. 1 that the exemplary embodiment of the camera 100 also comprises a housing. The housing is assembled in two pieces and has the front housing 106 and the rear housing 107. The rear housing 107 and the front housing 106 can be connected to one another in a material-locking or form-fitting manner. The rear housing 107 in turn comprises an aperture through which the connector 108 protrudes. The connector 108 is arranged on the printed circuit board 104 and is designed to electrically connect the printed circuit board 104.

Figure 2:
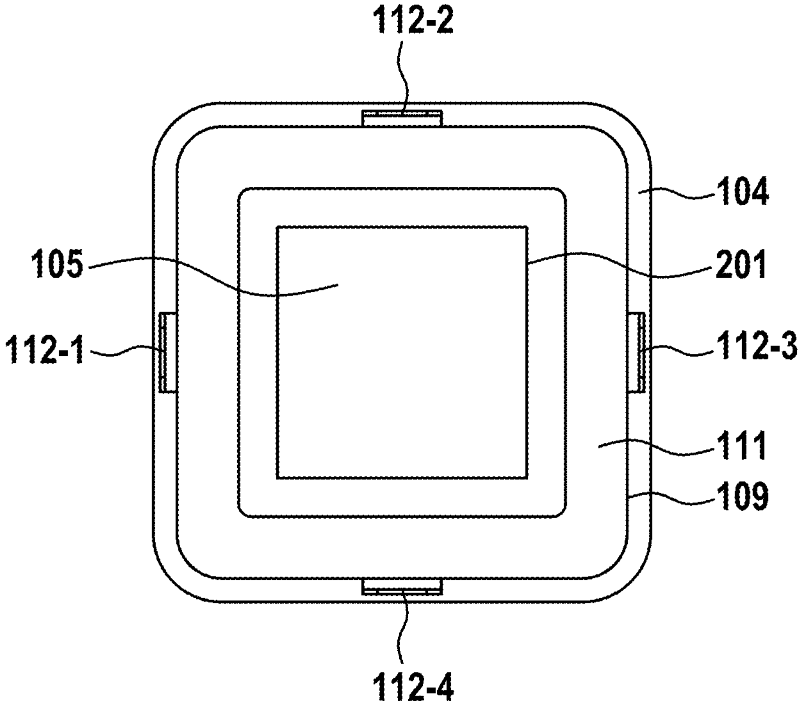
FIG. 2 shows an exemplary embodiment for positioning a carrier element on a printed circuit board, according to the present invention.

FIG. 2 shows an exemplary embodiment for a positioning of a carrier element 109 on a printed circuit board 104. Here, in particular, this is the carrier element 109 and the printed circuit board 104 of the exemplary embodiment of the camera 100 from FIG. 1. Here, the printed circuit board 104 has a square base with rounded corners. In this example, the carrier element 109 is formed in one piece. The flat plate 111 of the carrier element 109 is also designed to be square, with rounded corners. Here, the flat plate 111 has the recess 201. The recess 201 allows the image sensor 105 to be arranged in the center of the printed circuit board 104. Here, the carrier element 109 has four spring-loaded tabs 112-1 to 112-4.

Figure 3:
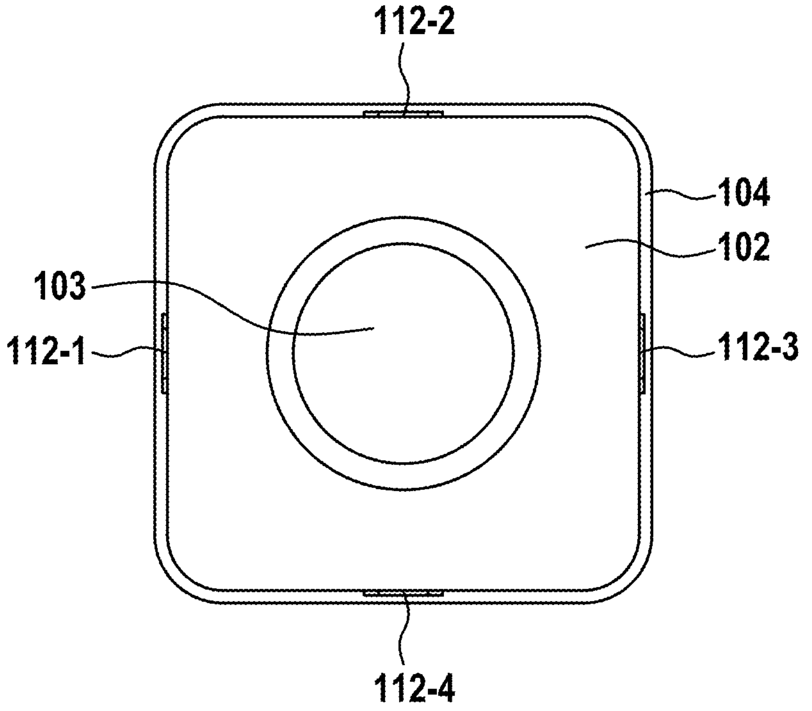
FIG. 3 shows a top view of the first exemplary embodiment of the camera of the present invention.

FIG. 3 shows a top view of the first exemplary embodiment of the camera 100 from FIG. 1, wherein the front housing is not shown. This corresponds to the view of the printed circuit board 104 and the carrier element 109 in FIG. 2, except that the lens assembly housing 102 and the optical lens 103 can now also be seen. It can be seen that the spring-loaded tabs 112-1 to 112-4 allow the carrier element 109 to make contact with the lens assembly housing 102.

Figure 4:
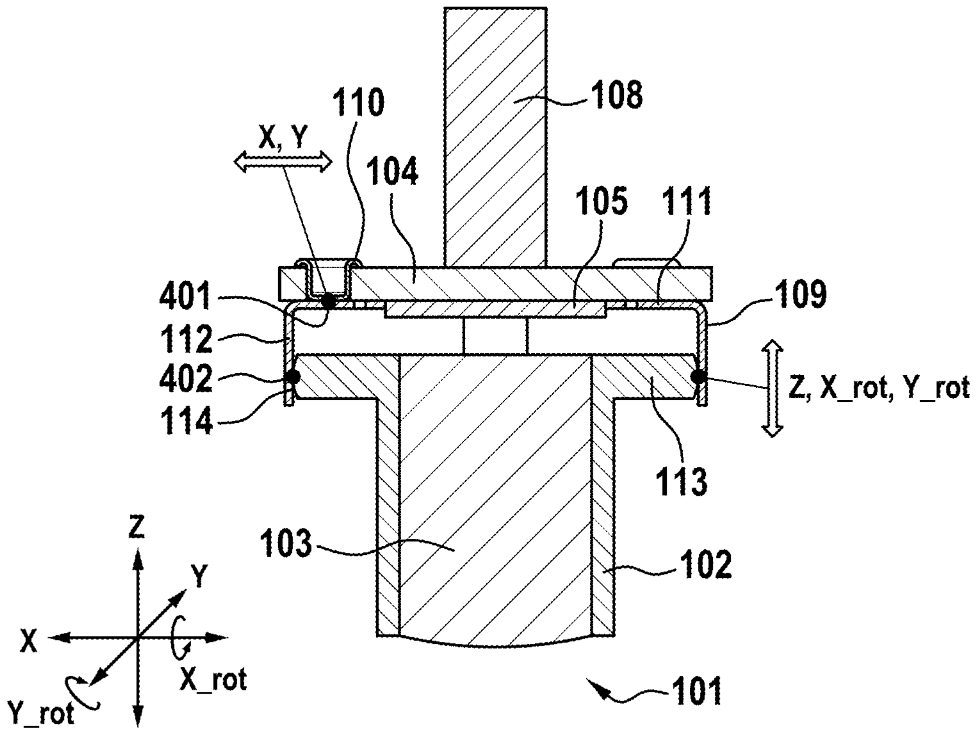
FIG. 4 shows a first exemplary embodiment of the optical alignment and fastening of the carrier element to the printed circuit board and the lens assembly housing, according to the present invention.

FIG. 4 shows a first exemplary embodiment of optically aligning and fastening the carrier element 109 to the printed circuit board 104 and the lens assembly housing 102 as a step of a method for assembling a camera 100, such as described, for example, in the above-described figures.

Here, the optical alignment of the image sensor 105 to the lens assembly 101 is a step in the method for assembling a camera 100. Initially, the method also comprises the following steps: providing the printed circuit board 104 with the image sensor 105 arranged thereon; arranging the carrier element 109 on a side carrying the image sensor 105 on the printed circuit board 104, wherein the carrier element 109 has at least three spring-loaded tabs 112 that, in the arrangement, are aligned pointing away from the image sensor 105; providing a lens assembly 101 having a lens assembly housing 102 and at least one optical lens 103, wherein the lens assembly housing 102 has a crowned contour 114; and inserting the lens assembly 101 into the carrier element 109 in such a way that the spring-loaded tabs 112 rest against the crowned contour 114.

At the stage of the method shown here, certain parts of the camera are initially still movable relative to one another. In this way, the carrier element 109 can be displaced along the x-axis and along the y-axis on the printed circuit board 104. This is indicated by the corresponding double arrow. In addition, the lens assembly 101 and with it the lens assembly housing 102, against whose crowned contour 114 the spring-loaded tabs 112 of the carrier element 109 rest, can be displaced along the z-axis and along the axis of rotation X_rot and along the axis of rotation Y_rot. This in turn is indicated by the corresponding double arrow. Here, the spring-loaded tabs 112 can exert force on the lens assembly housing 102 and in this way ensure contact with the contour 114.

The carrier element 109 is fastened to the printed circuit board 104 after the step of optical alignment. For this purpose, press-fit bushings 110 are in each case inserted into an aperture of the printed circuit board 104 and the carrier element 109 and the press-fit bushings 110 are in each case connected to one another at a contact point by means of a laser-welded joint 401. The spring-loaded tabs 112 of the carrier element 109 are also fastened to the crowned contour 114 of the lens assembly housing 102 in each case by means of a laser-welded joint 402.

Figure 5:
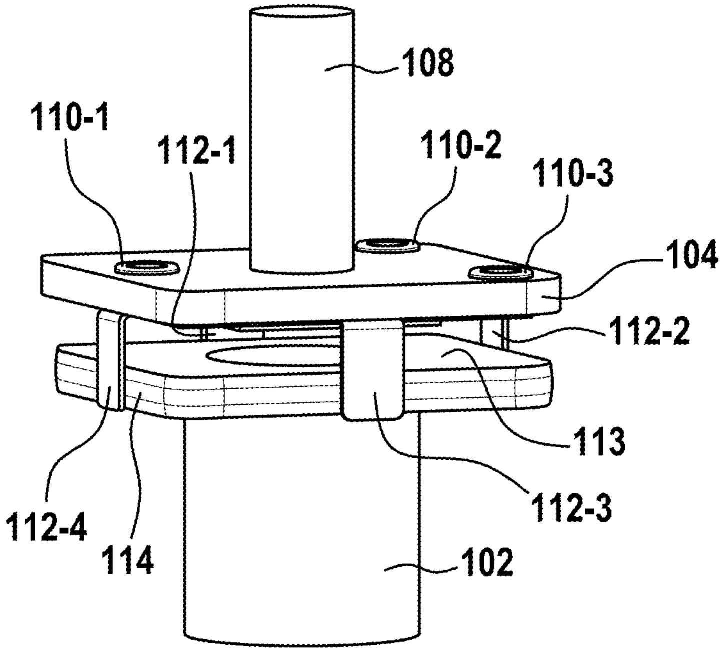
FIG. 5 shows a three-dimensional view of the first exemplary embodiment of the camera, according to the present invention.

FIG. 5 once again shows a three-dimensional view of the first exemplary embodiment of the camera 100, here without the housing, as it was assembled, for example, as shown in FIG. 4. It can be seen here that the printed circuit board 104 has three apertures, into each of which a press-fit bushing 110-1 to 110-3 is inserted and to which the carrier element 109 is fastened.

Figure 6:
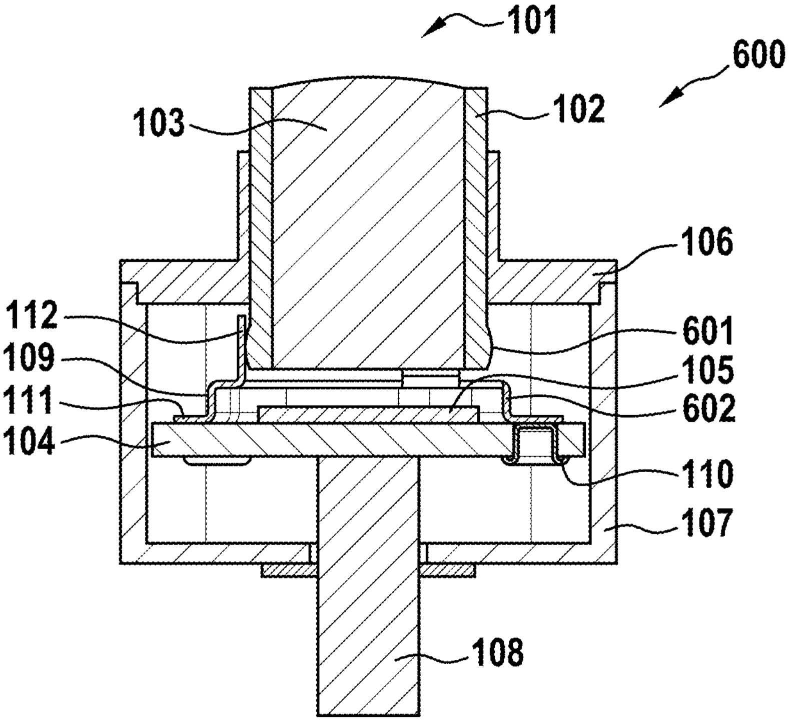
FIG. 6 shows second exemplary embodiment of a camera in a sectional view, according to the present invention.

FIG. 6 shows a second exemplary embodiment of a camera 600 in a sectional view. Here, the camera 600 is similar to the camera 100 from the first exemplary embodiment, so that mainly the differences to the camera 100 are discussed below.

The lens assembly housing 102 of the camera 600 does not have a collar. Rather, the lens assembly housing 102 has the crowned contour 601 at an end facing the image sensor 105. The carrier element 109 has a flat plate 111 fastened to the printed circuit board 104, and the spring-loaded tabs 112 of the carrier element 109 and the plate 111 are connected to one another by means of an L-shaped portion 602.

Figure 7:
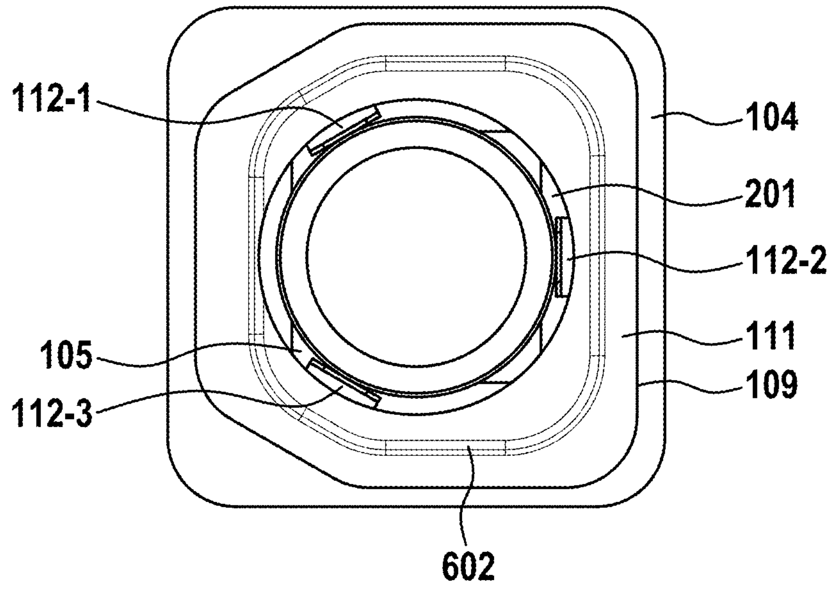
FIG. 7 shows a second exemplary embodiment for a positioning of a carrier element on a printed circuit board, according to the present invention.

The positioning of the carrier element 109 of the camera 600 on the printed circuit board 104 is shown again in FIG. 7. This is a top view of the camera 600, without the housing 106, 107. The flat plate 111 of the carrier element 109 again has a recess 201, in which the image sensor 105 is arranged. Here, the flat plate 111 is designed as an irregular hexagon. The L-shaped portion forms a round recess, on which three spring-loaded tabs 112-1 to 112-3 are arranged in a distributed manner.

The carrier element 109 shown here is designed in one piece. Alternatively, it can also be designed in multiple parts.

Figure 8:
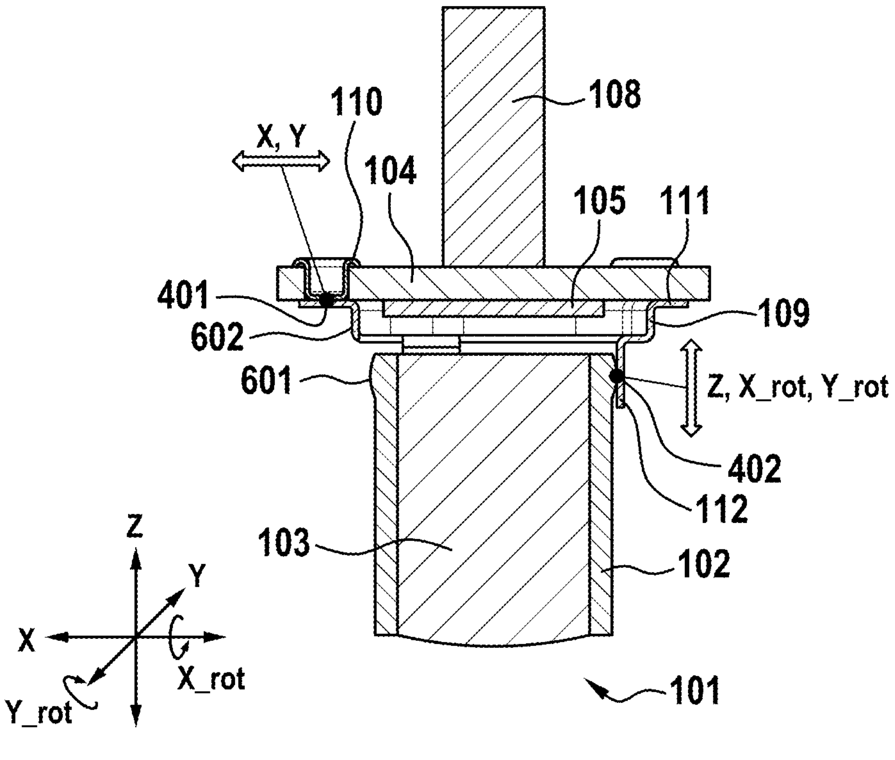
FIG. 8 shows a second exemplary embodiment of the optical alignment and the fastening of the carrier element to the printed circuit board and the lens assembly housing, of the present invention.

FIG. 8 shows a second exemplary embodiment of optically aligning and fastening the carrier element 109 to the printed circuit board 104 and to the lens assembly housing 102 as a step in a method for assembling a camera 600, such as described, for example, in FIGS. 6 and 7. Just as in the method from FIG. 4, the optical alignment of the image sensor 105 to the lens assembly 101 is also a step in the method for assembling a camera 600. In the example shown here, the method comprises the same preliminary steps as described in FIG. 4.

At the stage of the method shown in FIG. 8, certain parts of the camera are initially still movable relative to one another. In this way, the carrier element 109 can be displaced along the x-axis and along the y-axis on the printed circuit board 104. This is indicated by the corresponding double arrow. In addition, the lens assembly 101 and with it the lens assembly housing 102, against whose crowned contour 601 the spring-loaded tabs 112 of the carrier element 109 rest, can be displaced along the z-axis and along the axis of rotation X_rot and along the axis of rotation Y_rot. This is also indicated by a corresponding double arrow. Here, the spring-loaded tabs 112 can exert force on the lens assembly housing 102 and in this way ensure contact with the contour 601.

The carrier element 109 is fastened to the printed circuit board 104 after the step of optical alignment. For this purpose, press-fit bushings 110 are in each case inserted into an aperture of the printed circuit board 104 and the carrier element 109 and the press-fit bushings 110 are in each case connected to one another at a contact point by means of a laser-welded joint 401. The spring-loaded tabs 112 of the carrier element 109 are also fastened to the crowned contour 601 of the lens assembly housing 102 in each case by means of a laser-welded joint 402.

Figure 9:
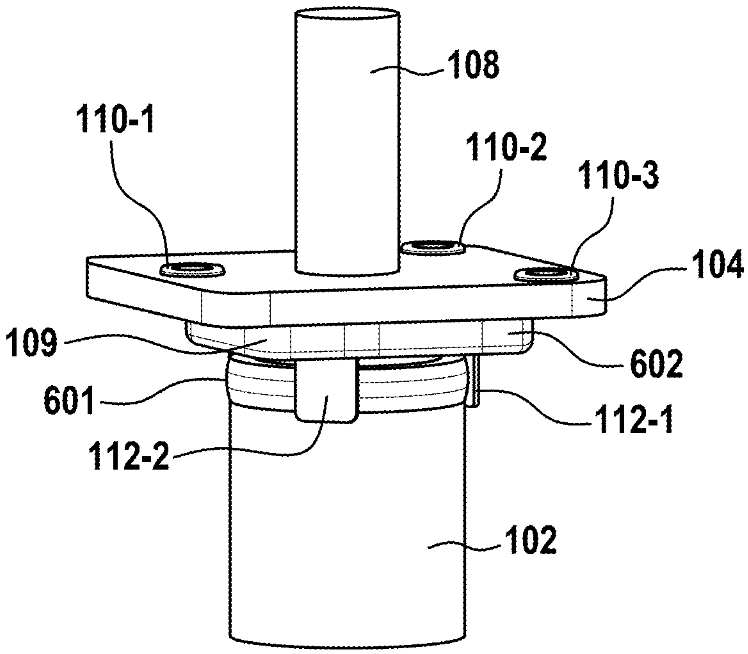
FIG. 9 shows a three-dimensional view of the second exemplary embodiment of the camera, of the present invention.

FIG. 9 once again shows a three-dimensional view of the camera 600, here without the housing, as it was assembled, for example, as shown in FIG. 8. It can be clearly seen here that the printed circuit board 104 has three apertures, into each of which a press-fit bushing 110-1 to 110-3 is inserted and to which the carrier element 109 is fastened.

Figure 10:
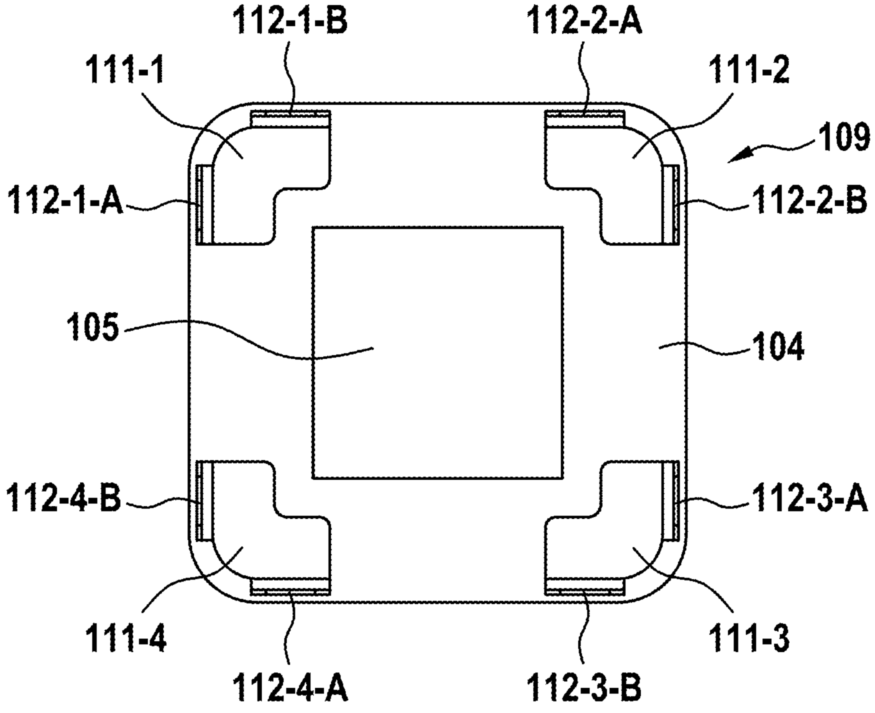
FIG. 10 shows an exemplary embodiment for a positioning of a multi-piece carrier element on a printed circuit board, of the present invention.

FIG. 10 shows an exemplary embodiment for a positioning of a multi-piece carrier element 109 on a printed circuit board 104. In this example, the printed circuit board 104 is designed to be square with rounded corners. The carrier element 109 is formed from four individual parts. These individual parts are arranged in each of the four corners of the printed circuit board 104. Here, each of the four parts in each case has a flat plate 111-1 to 111-4. Furthermore, each of the four parts in each case has two spring-loaded tabs in the axial direction, which point to a lens assembly in an assembled camera. These are the spring-loaded tabs 112-1-A and 112-1-B for the first part, the spring-loaded tabs 112-2-A and 112-2-B for the second part, the spring-loaded tabs 112-3-A and 112-3-B for the third part and the spring-loaded tabs 112-4-A and 112-4-B for the fourth part.

Figure 11:
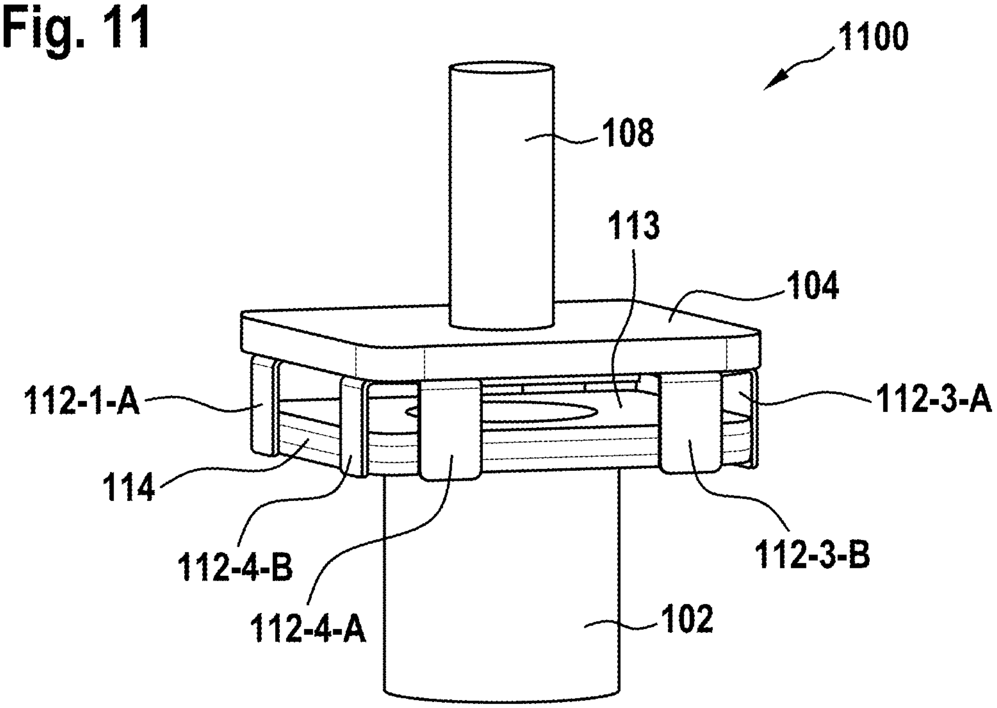
FIG. 11 shows a three-dimensional view of the exemplary embodiment of the camera with the multi-piece carrier element, of the present invention.

FIG. 11 shows a three-dimensional view of an exemplary embodiment of the camera 1100 with a multi-piece carrier element, as described in FIG. 10. In this example, the lens assembly housing 102 in turn has a collar 113 protruding radially outwards. The lens assembly housing 102 has the crowned contour 114 at one end of the collar 113. The spring-loaded tabs 112 are designed in such a way that they extend from the flat plates of the individual parts of the carrier element 109, which are fastened to the printed circuit board 104, in an axial direction towards the collar 113.

Not shown here, the camera 1100 can also have a housing, in particular a rear housing and a front housing.

FIG. 12A-12D show examples of fastening options for a carrier element 109 on a printed circuit board 104.

Figure 12A:
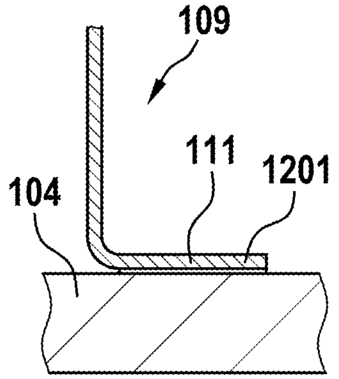
FIG. 12A-12D show examples of fastening options for a carrier element on a printed circuit board, according to the present invention.

In the example of FIG. 12A, the flat plate 111 of the carrier element 109 is fastened to the printed circuit board 104 in material-locking manner by means of a soldered joint 1201. Under certain circumstances, the mobility of the carrier element 109 relative to the printed circuit board 104 along the x-axis and along the y-axis during the optical alignment step may be omitted here.

Figure 12B:
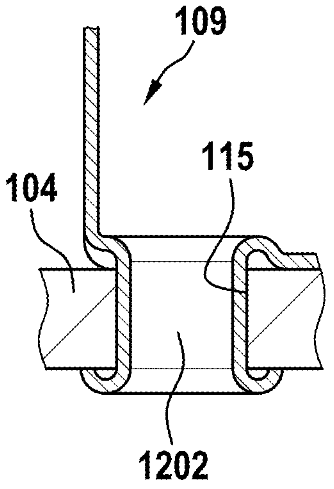

In the example of FIG. 12B, the printed circuit board 104 has an aperture 115. The carrier element 109 has a rivet 1202, by means of which it is fastened to the printed circuit board 104. Under certain circumstances, the mobility of the carrier element 109 relative to the printed circuit board 104 along the x-axis and along the y-axis during the optical alignment step may be omitted here as well.

Figure 12C:
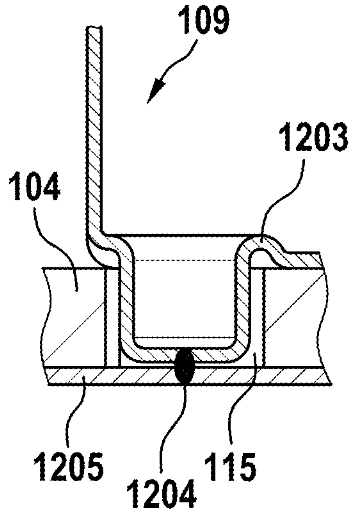

In the example of FIG. 12C, the printed circuit board 104 also has an aperture 115. The carrier element 109 has a projection 1203 protruding into the aperture 115. The projection 1203 is fixed in a material-locking manner to a fixing plate 1205 arranged on an opposite side of the printed circuit board 105.

In an assembled camera, this opposite side is a side opposite an image sensor. The fastening to the fixing plate 1205 can be realized, for example, by means of a laser-welded joint 1204.

Figure 12D:
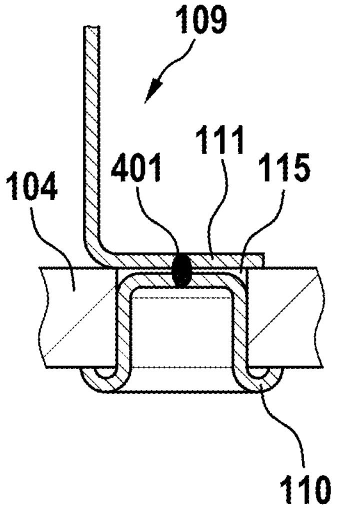

In the example of FIG. 12D, the printed circuit board 104 also has an aperture 115. A press-fit bushing 110 is inserted into the aperture 115, to which the carrier element 109 or a flat plate 111 of the carrier element 109 is fastened in a material-locking manner. The fastening can be realized, for example, by means of a laser-welded joints 401.

Figure 13:
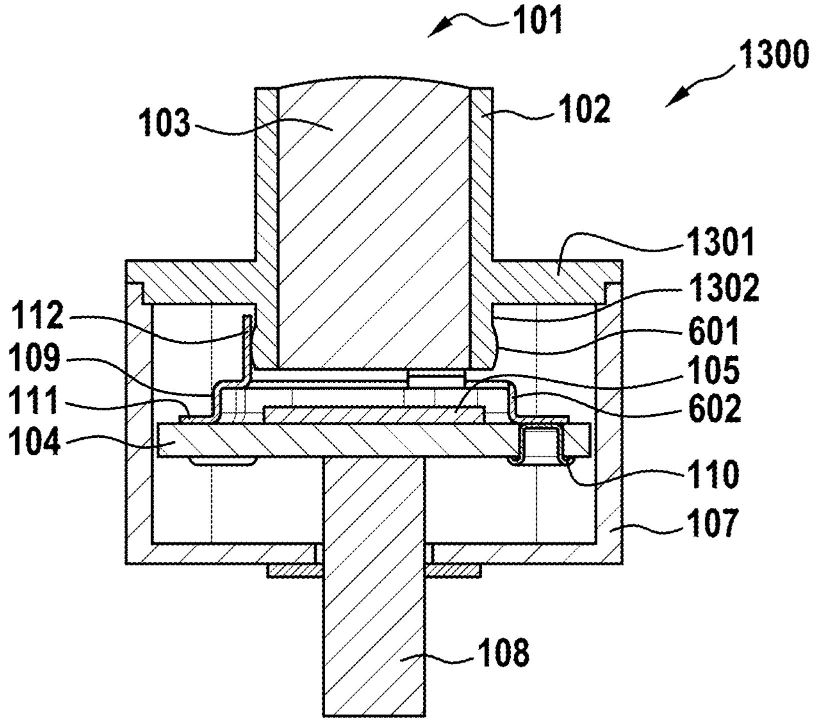
FIG. 13 shows a further exemplary embodiment of a camera with a one-piece front housing and lens assembly housing, according to the present invention.

FIG. 13 shows a further exemplary embodiment of a camera 1300 with a one-piece front housing and lens assembly housing. With respect to the carrier element 109 and the fastening of the carrier element 109 to the lens assembly housing 102, the camera 1300 corresponds to the camera 600 from FIG. 6. Here as well, the lens assembly housing 102 has a crowned contour 601 at one end facing the image sensor 105. The carrier element 109 has a flat plate 111 fastened to the printed circuit board 104, and the spring-loaded tabs 112 and the plate 111 are connected to one another by means of an L-shaped portion 602.

In contrast to the camera 600, the lens assembly housing 102 of the camera 1300 also constitutes the front housing of the camera. In other words, the front housing and the lens assembly housing are designed in one piece. Here, the lens assembly housing 102 has a collar 1301 protruding radially outwards. In this case, the collar 1301 does not have the crowned contour 601. Rather, the rear housing 107 of the camera 1300 is arranged at the end of the collar 1301. Here, the collar 1301 and the rear housing 107 can be connected to one another in a material-locking or form-fitting manner.

What is claimed is:

1. A camera for a motor vehicle, comprising:
- a lens assembly having a lens assembly housing and at least one optical lens;
- a printed circuit board having an image sensor arranged on the printed circuit board, wherein the image sensor faces the lens assembly and is optically aligned with the lens assembly; and
- a carrier element, which is fastened to the printed circuit board;
- wherein the carrier element is fastened to the printed circuit board on a side of the printed circuit board carrying the image sensor;
- wherein the carrier element has at least three spring-loaded tabs pointing in an axial direction towards the lens assembly;
- wherein the lens assembly housing has a crowned contour against which the spring-loaded tabs are configured to rest; and
- wherein the spring-loaded tabs are in each case fastened to the crowned contour of the lens assembly housing by a laser-welded joint.

2. The camera according to claim 1, wherein the carrier element is in one or more pieces.

3. The camera according to claim 1, wherein the lens assembly housing has a collar protruding radially outwards and has the crowned contour at one end of the collar, and wherein the spring-loaded tabs extend from a flat plate of the carrier element, which is fastened to the printed circuit board, in an axial direction towards the collar.

4. The camera according to claim 1, wherein the lens assembly housing has the crowned contour at an end facing the image sensor, wherein the carrier element has a flat plate fastened to the printed circuit board, and wherein the spring-loaded tabs and the plate are connected to one another by an L-shaped portion.

5. The camera according to claim 1, wherein the carrier element is fastened to the printed circuit board in a material-locking or form-fitting manner.

6. The camera according to claim 5, wherein:
- the printed circuit board has at least one aperture; and:
- (i) the carrier element has at least one rivet by which the carrier element is fastened to the printed circuit board; or (ii) the carrier element has at least one projection protruding into the at least one aperture, which is fastened in a material-locking manner to a fixing plate arranged on a side of the printed circuit board opposite the image sensor; or (iii) a press-fit bushing, to which the carrier element is fastened in a material-locking manner, is inserted into the aperture.

7. The camera according to claim 1, further comprising a rear housing and a front housing.

8. The camera according to claim 7, wherein the front housing and the lens assembly housing are formed in one piece.

9. A method for assembling a camera, comprising the following steps:

providing a printed circuit board having an image sensor arranged on the printed circuit board;

arranging a carrier element on a side of the printed circuit board that carries the image sensor, wherein the carrier element has at least three spring-loaded tabs that, in the arrangement, are aligned pointing away from the image sensor;

providing a lens assembly having a lens assembly housing and at least one optical lens, wherein the lens assembly housing has a crowned contour;

inserting the lens assembly into the carrier element in such a way that the spring-loaded tabs rest against the crowned contour;

optically aligning the image sensor to the lens assembly;

fastening the carrier element to the printed circuit board; and fastening the spring-loaded tabs to the crowned contour of the lens assembly housing in each case by a laser-welded joint.

* * * * *